(12) United States Patent
Yasuda et al.

(10) Patent No.: US 12,184,991 B2
(45) Date of Patent: Dec. 31, 2024

(54) IMAGING DEVICE AND IMAGE PROCESSING SYSTEM

(71) Applicant: SONY SEMICONDUCTOR SOLUTIONS CORPORATION, Kanagawa (JP)

(72) Inventors: Mikita Yasuda, Kanagawa (JP); Naoya Haneda, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 18/042,020

(22) PCT Filed: Aug. 12, 2021

(86) PCT No.: PCT/JP2021/029773
§ 371 (c)(1),
(2) Date: Feb. 17, 2023

(87) PCT Pub. No.: WO2022/044839
PCT Pub. Date: Mar. 3, 2022

(65) Prior Publication Data
US 2024/0015409 A1    Jan. 11, 2024

(30) Foreign Application Priority Data

Aug. 25, 2020  (JP) .................................. 2020-142096

(51) Int. Cl.
*H04N 23/84*    (2023.01)
*H04N 23/81*    (2023.01)
(Continued)

(52) U.S. Cl.
CPC .......... *H04N 23/843* (2023.01); *H04N 23/81* (2023.01); *H04N 23/88* (2023.01); *H04N 25/50* (2023.01)

(58) Field of Classification Search
CPC ........ H04N 23/81; H04N 23/88; H04N 25/50; H04N 25/78; H04N 25/79; H04N 19/46; H04N 19/85; H04N 23/00; H04N 23/60
See application file for complete search history.

(56) References Cited

U.S. PATENT DOCUMENTS

| | | | |
|---|---|---|---|
| 2002/0015447 A1* | 2/2002 | Zhou ....................... | H04N 19/42 386/E5.072 |
| 2005/0052547 A1* | 3/2005 | Minakuti ............... | H04N 23/88 348/224.1 |

(Continued)

FOREIGN PATENT DOCUMENTS

| | | |
|---|---|---|
| JP | 2011-166219 A | 8/2011 |
| JP | 2017-135760 A | 8/2017 |

(Continued)

OTHER PUBLICATIONS

International Search Report and Written Opinion of PCT Application No. PCT/JP2021/029773, issued on Oct. 26, 2021, 09 pages of ISRWO.

*Primary Examiner* — Abdelaaziz Tissire
(74) *Attorney, Agent, or Firm* — CHIP LAW GROUP

(57) ABSTRACT

An imaging device according to the present disclosure includes: a sensor layer including a light receiving section that outputs a pixel signal corresponding to incident light, the sensor layer that outputs RAW data based on the pixel signal; and a logic circuit layer that is stacked on the sensor layer, and includes an image processing circuit and an encoder, the image processing circuit that performs at least some pieces of preprocessing of a plurality of pieces of preprocessing to be performed before demosaic processing on the RAW data from the sensor layer, and the encoder that encodes the RAW data having been subjected to the pieces of preprocessing by the image processing circuit.

10 Claims, 7 Drawing Sheets

(51) Int. Cl.
*H04N 23/88* (2023.01)
*H04N 25/50* (2023.01)

(56) References Cited

U.S. PATENT DOCUMENTS

| | | | | |
|---|---|---|---|---|
| 2008/0088857 A1* | 4/2008 | Zimmer | ............ | H04N 1/56 |
| | | | | 358/1.6 |
| 2015/0281539 A1* | 10/2015 | Ueki | ............ | H04N 19/12 |
| | | | | 348/298 |
| 2020/0162671 A1* | 5/2020 | Toda | ............ | H04N 5/2628 |
| 2021/0014530 A1* | 1/2021 | Ando | ............ | H04N 19/593 |
| 2021/0037186 A1* | 2/2021 | Kuwahara | ............ | H04N 25/50 |

FOREIGN PATENT DOCUMENTS

| | | | |
|---|---|---|---|
| JP | 2017-143355 A | 8/2017 | |
| JP | 2018-129753 A | 8/2018 | |
| JP | 2019-071522 A | 5/2019 | |
| JP | 2019-135818 A | 8/2019 | |
| WO | 2015/064402 A1 | 5/2015 | |
| WO | 2019/142821 A1 | 7/2019 | |
| WO | WO-2019151030 A1 * | 8/2019 | ............ G02B 27/646 |

* cited by examiner

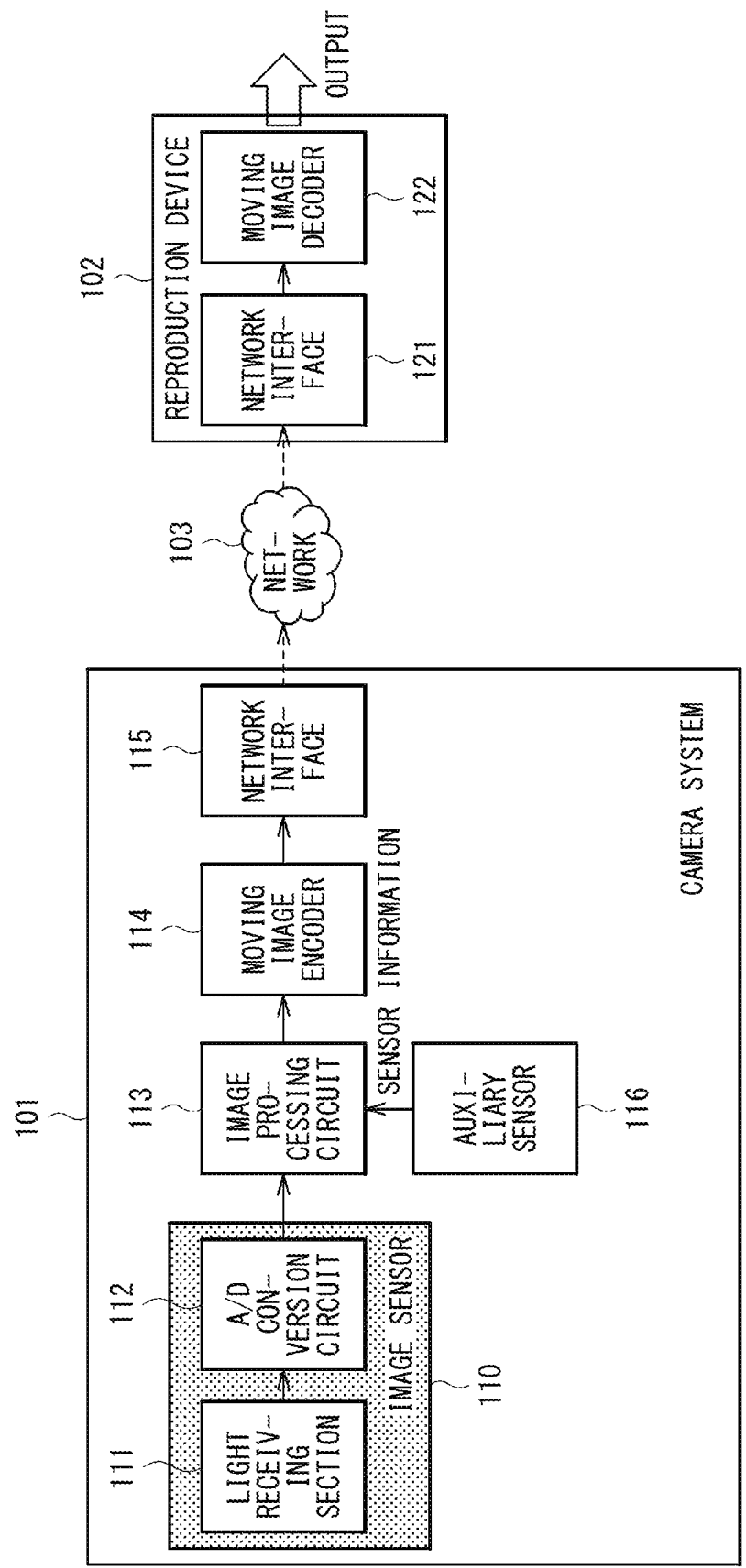

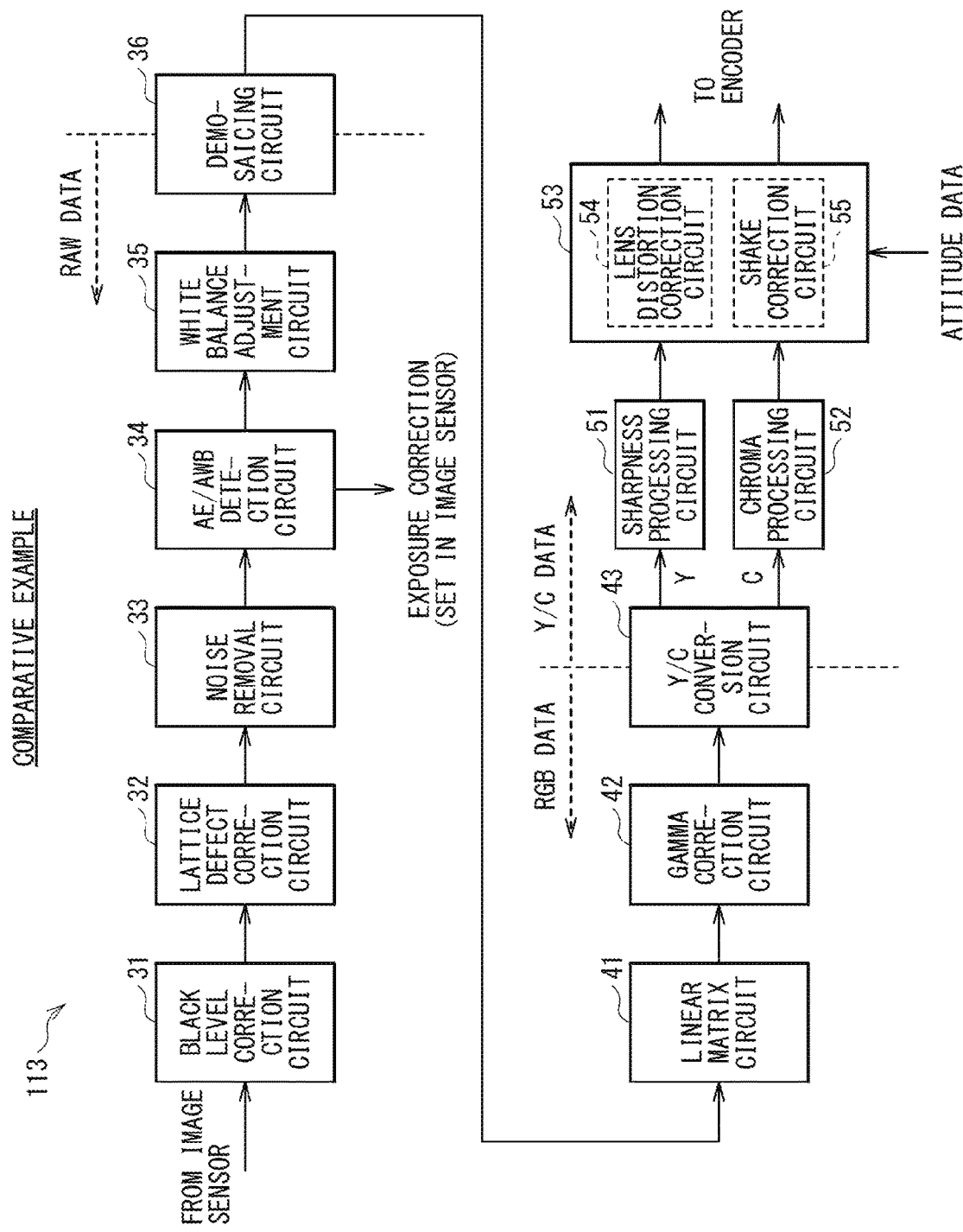
[FIG. 2]

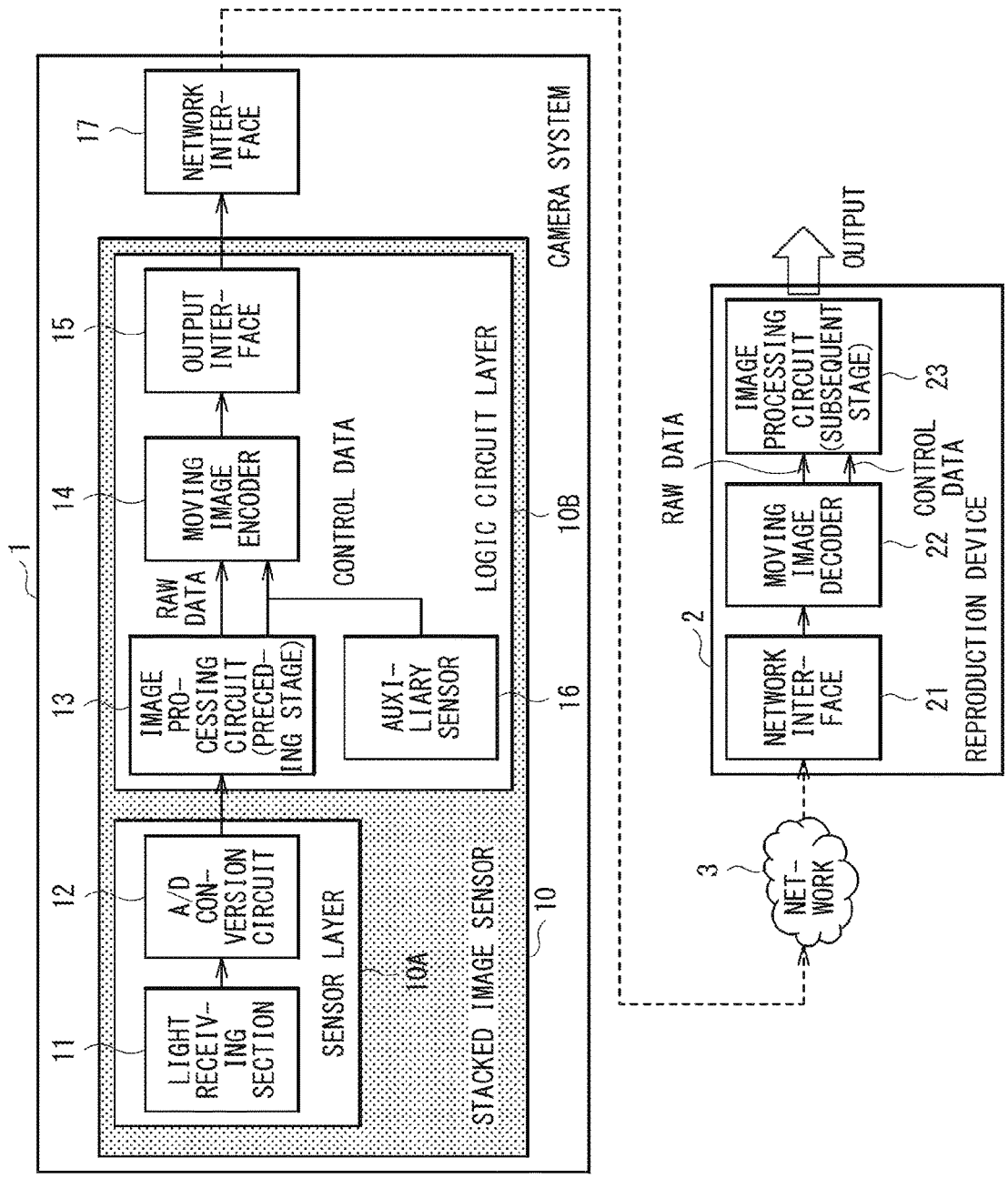
[FIG. 3]

[FIG. 4]
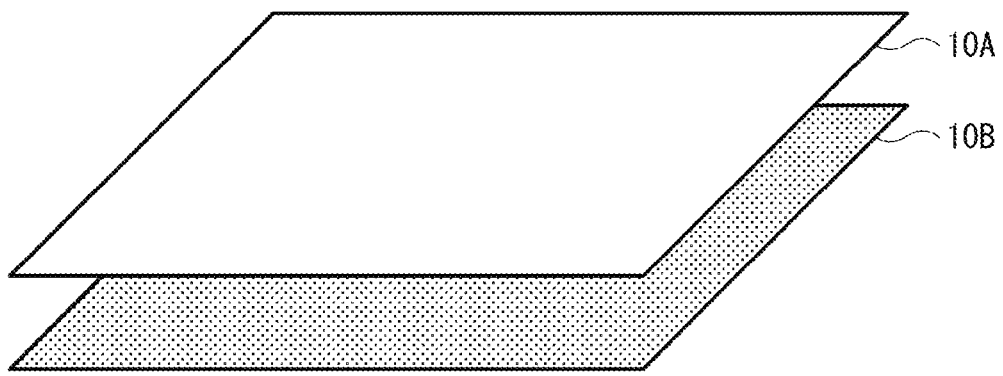

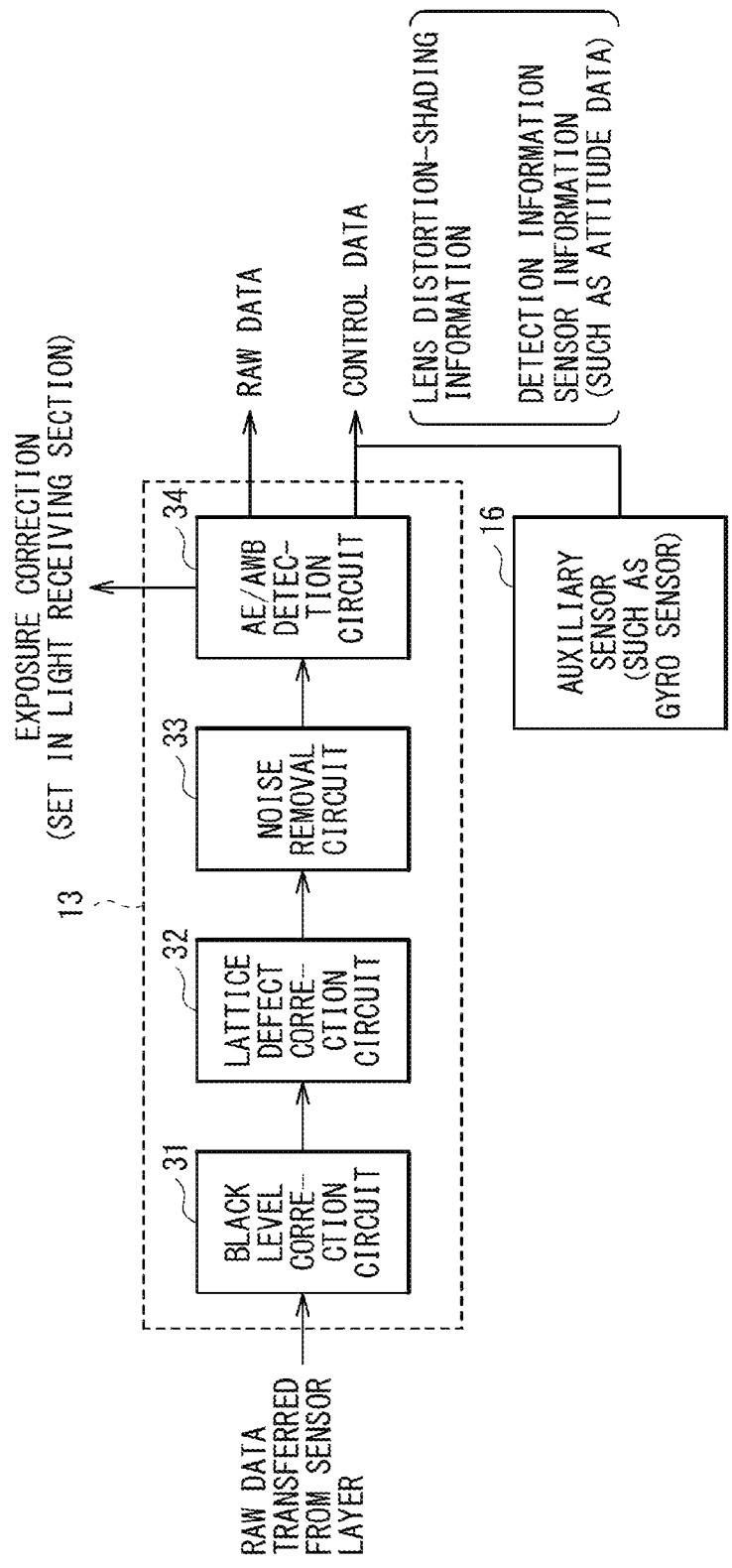
[FIG. 5]

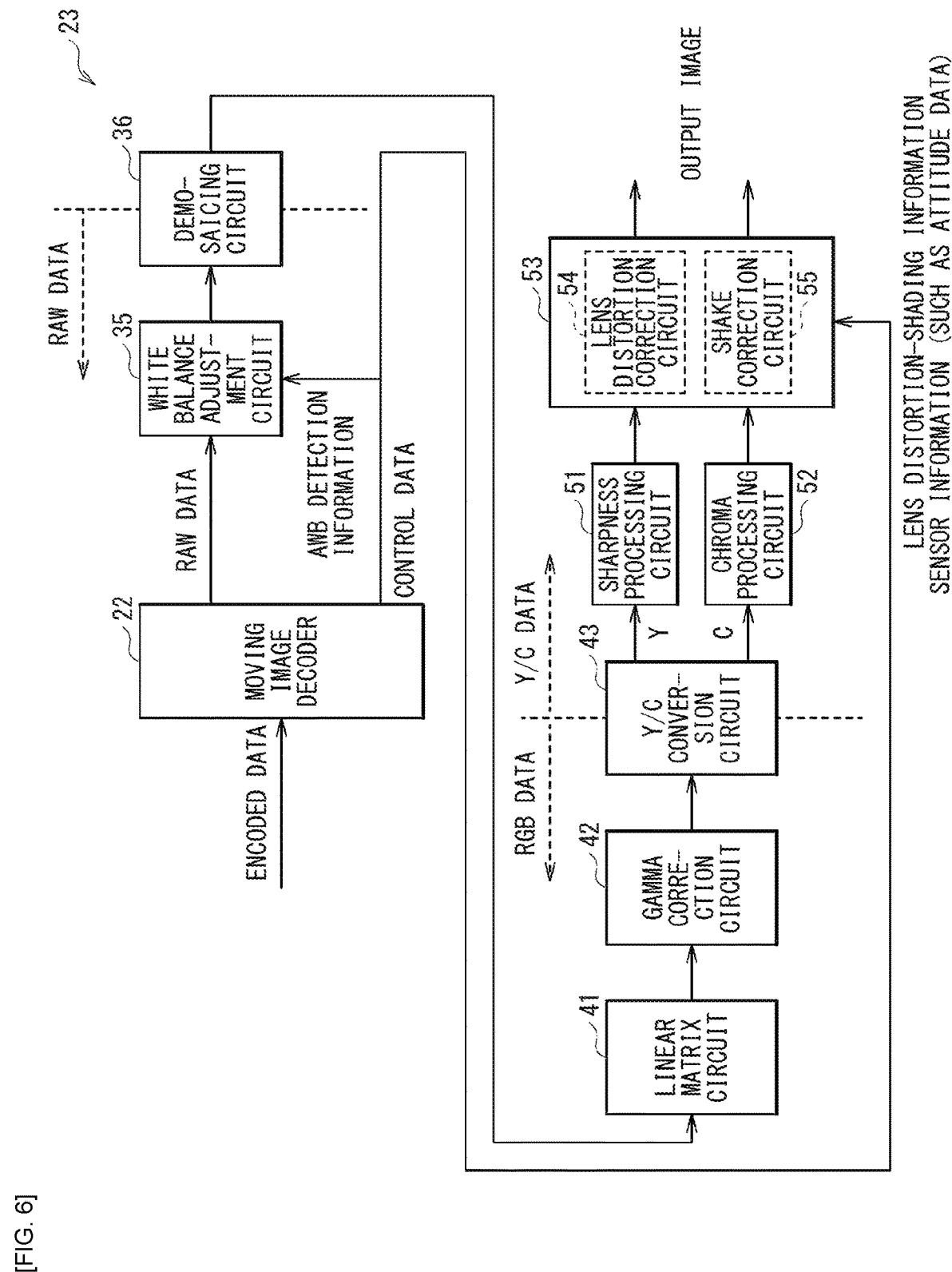
[FIG. 6]

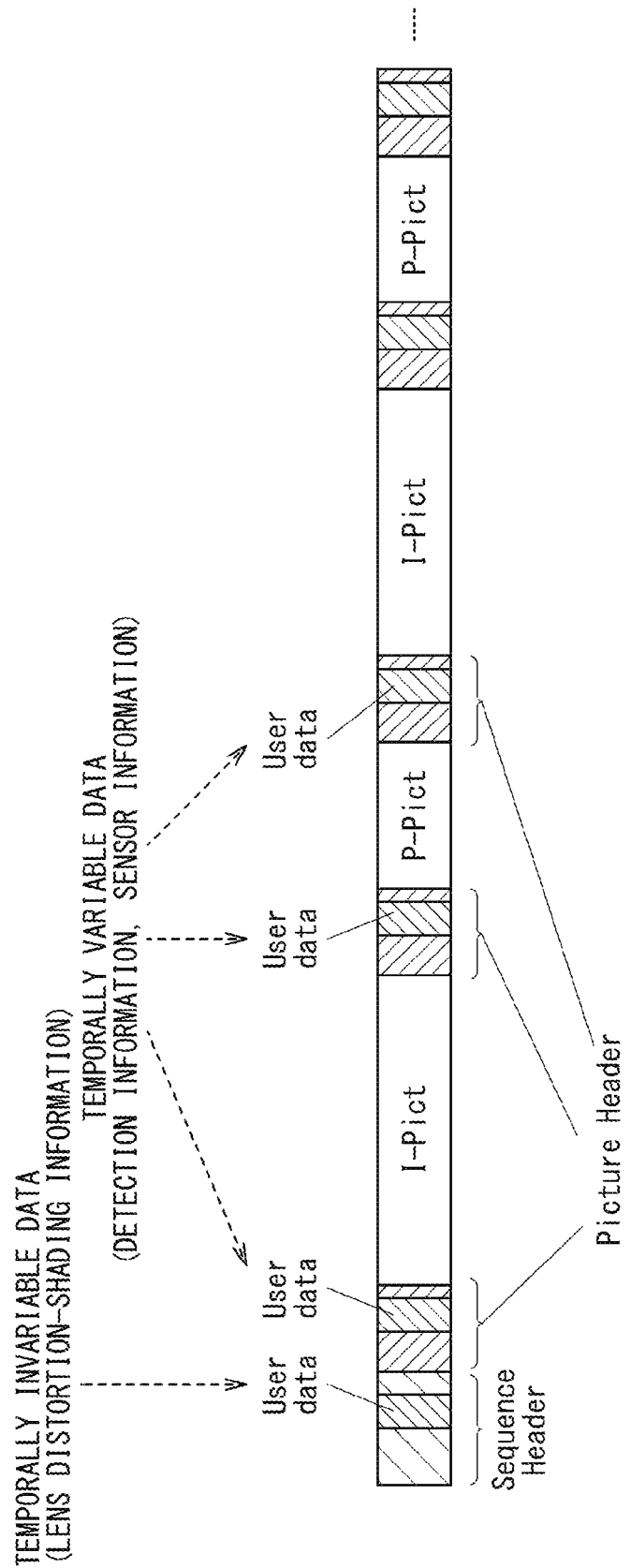
[FIG. 7]

IMAGING DEVICE AND IMAGE PROCESSING SYSTEM

CROSS REFERENCE TO RELATED APPLICATIONS

This application is a U.S. National Phase of International Patent Application No. PCT/JP2021/029773 filed on Aug. 12, 2021, which claims priority benefit of Japanese Patent Application No. JP 2020-142096 filed in the Japan Patent Office on Aug. 25, 2020. Each of the above-referenced applications is hereby incorporated herein by reference in its entirety.

TECHNICAL FIELD

The present disclosure relates to an image device suitable for a stacked image sensor, and an image processing system.

BACKGROUND ART

There is a stacked image sensor having a structure in which a sensor layer that includes a light receiving section and a logic circuit layer that performs a piece of image processing on an image signal from the light receiving section are stacked (for example, see PTL 1). In addition, there is technology for encoding RAW data outputted from an image sensor (for example, see PTLs 2 to 4). Meanwhile, in general, in an imaging device, for example, RAW data outputted from an image sensor is subjected to various pieces of image processing to be converted into Y (luminance)/C (chroma) data that is a standard input format of image encoding, and the Y/C data is encoded.

CITATION LIST

Patent Literature

PTL 1: Japanese Unexamined Patent Application Publication No. 2017-135760
PTL 2: Japanese Unexamined Patent Application Publication No. 2011-166219
PTL 3: Japanese Unexamined Patent Application Publication No. 2018-129753
PTL 4: International Publication No. WO2015/064402

SUMMARY OF THE INVENTION

In a case where all circuits that perform pieces of image processing and image encoding are mounted on a logic circuit layer in a stacked image sensor, a circuit area is increased, and electric power consumption is also increased.

It is desirable to provide an imaging device and an image processing system that make it possible to achieve circuit miniaturization and low electric power consumption.

An imaging device according to an embodiment of the present disclosure includes: a sensor layer including a light receiving section that outputs a pixel signal corresponding to incident light, the sensor layer that outputs RAW data based on the pixel signal; and a logic circuit layer that is stacked on the sensor layer, and includes an image processing circuit and an encoder, the image processing circuit that performs at least some pieces of preprocessing of a plurality of pieces of preprocessing to be performed before demosaic processing on the RAW data from the sensor layer, and the encoder that encodes the RAW data having been subjected to the pieces of preprocessing by the image processing circuit.

An image processing system according to an embodiment of the present disclosure includes: an imaging device that encodes and outputs RAW data based on a pixel signal; and a reproduction device that decodes and reproduces the RAW data encoded by the imaging device. The imaging device includes a sensor layer including a light receiving section that outputs the pixel signal corresponding to incident light, the sensor layer that outputs the RAW data based on the pixel signal, and a logic circuit layer that is stacked on the sensor layer and includes a preceding image processing circuit and an encoder, the preceding image processing circuit that performs at least some pieces of preprocessing of a plurality of pieces of preprocessing to be performed before demosaic processing on the RAW data from the sensor layer, and the encoder that encodes the RAW data having been subjected to the pieces of preprocessing by the preceding image processing circuit.

In the imaging device or the imaging processing system according to the embodiment of the present disclosure, the logic circuit layer stacked on the sensor layer performs at least some pieces of preprocessing of the plurality of pieces of preprocessing to be performed before the demosaic processing on the RAW data from the sensor layer, and encodes and outputs the RAW data having been subjected to the pieces of preprocessing.

BRIEF DESCRIPTION OF DRAWINGS

FIG. 1 is a block diagram illustrating a configuration example of an image processing system according to a comparative example.

FIG. 2 is a block diagram illustrating a configuration example of an image processing circuit in a camera system of the image processing system according to the comparative example.

FIG. 3 is a block diagram illustrating a configuration example of an image processing system according to a first embodiment of the present disclosure.

FIG. 4 is a configuration diagram illustrating an example of a stacked structure of a stacked image sensor.

FIG. 5 is a block diagram illustrating a configuration example of an image processing circuit in a camera system of the image processing system according to the first embodiment.

FIG. 6 is a block diagram illustrating a configuration example of an image processing circuit in a reproduction device of the image processing system according to the first embodiment.

FIG. 7 is an explanatory diagram illustrating an example of stream data.

MODES FOR CARRYING OUT THE INVENTION

In the following, some embodiments of the present disclosure are described in detail with reference to the drawings. It is to be noted that description is given in the following order.

0. Comparative Example (FIGS. 1 and 2)
0.1 Configurations of Imaging Device and Imaging Processing System According to Comparative Example
0.2 Issues
1. First Embodiment (FIGS. 3 to 7)
1.1 Configuration
1.2 Operation
1.3 Effects
1.4 Modification Examples
2. Other Embodiments

0. Comparative Example

0.1 Configurations of Imaging Device and Imaging Processing System According to Comparative Example There is an image processing system that records, in a recording medium, encoded data obtained by encoding a moving image captured by an image sensor, or transmits the encoded data to a reproduction device with use of a network. In such an image processing system, in general, RAW data of the moving image is generated by the image sensor, and the generated RAW data is subjected to various pieces of image processing to be converted into Y/C data that is a standard input format of image encoding and thereafter, the Y/C data is encoded.

FIG. 1 illustrates a configuration example of an image processing system according to a comparative example.

The image processing system according to the comparative example illustrated in FIG. 1 is a network camera system in which encoded data of a moving image encoded in a camera system 101 as an imaging device is transmitted to a reproduction device 102 through a network 103 and the encoded data is decoded to reproduce the image.

The camera system 101 includes an image sensor 110, an image processing circuit 113, a moving image encoder 114, a network interface 115, and an auxiliary sensor 116.

The image sensor 110 includes a light receiving section 111 and an A (analog)/D (digital) conversion circuit 112.

The light receiving section 111 outputs a pixel signal corresponding to incident light having entered through an unillustrated shooting lens. The light receiving section 111 includes, for example, a photoelectric conversion element such as a photodiode, and includes a plurality of pixels. The light receiving section 111 includes, for example, a solid-state imaging element such as a CCD (Charge Coupled Device) or a CMOS (Complementary Metal Oxide Semiconductor). The A/D conversion circuit 112 performs A/D conversion of the pixel signal from the light receiving section 111, and outputs RAW data of a moving image based on the pixel signal.

The auxiliary sensor 116 outputs sensor information to the image processing circuit 113. The auxiliary sensor 116 includes, for example, a gyro sensor or the like, and outputs, for example, attitude data as the sensor information to the image processing circuit 113.

The image processing circuit 113 performs various pieces of image processing on the RAW data from the image sensor 110 to generate Y/C data.

The moving image encoder 114 outputs encoded data obtained by encoding the Y/C data from the image processing circuit 113.

The network interface 115 transmits the encoded data outputted from the moving image encoder 114 to the reproduction device 102 through the network 103.

The reproduction device 102 includes a network interface 121 and a moving image decoder 122.

The network interface 121 receives the encoded data transmitted from the camera system 101, and outputs the encoded data to the moving image decoder 122. The moving image decoder 122 decodes the encoded data.

FIG. 2 illustrates a configuration example of the image processing circuit 113 in the camera system 101 of the image processing system according to the comparative example.

The image processing circuit 113 includes a black level correction circuit 31, a lattice defect correction circuit 32, a noise removal circuit 33, an AE (Auto Exposure)/AWB (Auto White Balance) detection circuit 34, a white balance adjustment circuit 35, and a demosaicing circuit 36 as circuits that perform pieces of processing on the RAW data.

The image processing circuit 113 further includes a linear matrix circuit 41, a gamma correction circuit 42, and a Y/C conversion circuit 43 as circuits that perform pieces of processing on RGB data.

The image processing circuit 113 further includes a sharpness processing circuit 51, a chroma processing circuit 52, and a correction circuit 53 as circuits that perform pieces of processing on Y/C data.

The black level correction circuit 31 performs, on the RAW data, clamp processing for adjusting a black level.

The lattice defect correction circuit 32 performs, on the RAW data, defect correction processing of correcting a pixel signal of a defective pixel in the light receiving section 111.

The noise removal circuit 33 performs, on the RAW data, processing of removing a noise component.

The AE/AWB detection circuit 34 performs detection processing on the RAW data. The AE/AWB detection circuit 34 includes an exposure detection circuit and a white balance detection circuit. The exposure detection circuit performs detection processing for performing exposure control (exposure correction) of the image sensor 110. The white balance detection circuit performs detection processing for adjusting white balance.

The white balance adjustment circuit 35 performs adjustment of white balance on the RAW data on the basis of AWB detection information detected by the white balance detection circuit of the AE/AWB detection circuit 34.

The demosaicing circuit 36 performs demosaic processing on the RAW data to generate RGB data. For example, in a case where the pixels of the light receiving section 111 are arranged in a Bayer pattern, each pixel has only one-color information; therefore, an RGB plane signal having RGB three-color information per pixel is generated as the RGB data.

The linear matrix circuit 41 performs, on the RGB data, matrix operation processing to improve color reproducibility. The gamma correction circuit 42 performs gamma correction processing on the RGB data. The Y/C conversion circuit 43 performs processing of converting the RGB data into Y/C data including a Y (luminance) signal and a C (chroma) signal.

The sharpness processing circuit 51 performs sharpness processing on the Y signal. The chroma processing circuit 52 performs chroma processing on the C signal.

The correction circuit 53 performs image correction processing on the Y/C data having been subjected to the sharpness processing and the chroma processing. The correction circuit 53 includes a lens distortion correction circuit 54 and a shake correction circuit 55. The lens distortion correction circuit 54 performs processing of correcting lens distortion of an image caused by an unillustrated shooting lens. The shake correction circuit 55 performs image shake correction processing on the basis of, for example, the attitude data from the auxiliary sensor 116, or the like.

0.2 Issues

A configuration using a stacked image sensor having a structure in which a sensor layer that includes a light receiving section and a logic circuit layer that performs a piece of image processing on an image signal from the light receiving section are stacked is considered for the configuration of the imaging device according to the comparative example illustrated in FIG. 1. Using the stacked image sensor makes it possible to achieve miniaturization of the imaging device, and reducing extra pieces of signal processing between the light receiving section and a logic circuit makes it possible to reduce electric power consumption. For example, in PTL 1 (Japanese Unexamined Patent Application Publication No. 2017-135760), a logic circuit of a stacked image sensor includes an encoding circuit to reduce a signal band between a light receiving section and the logic circuit.

In a case where the logic circuit with a limited size of the stacked image sensor includes all circuits of the image processing circuit 113 and the moving image encoder 114 in the configuration of the imaging device according to the comparative example illustrated in FIGS. 1 and 2, a circuit area is increased, and electric power consumption is also increased.

1. First Embodiment

Next, description is given of an imaging device and an image processing system according to a first embodiment of the present disclosure. It is to be noted that in the following, components substantially the same as those of the imaging device and the image processing system according to the comparative example described above are denoted by the same reference numerals, and description thereof is omitted as appropriate.

1.1 Configuration

FIG. 3 illustrates a configuration example of the image processing system according to the first embodiment of the present disclosure.

The image processing system according to the first embodiment is a network camera system in which encoded data of a moving image encoded in a camera system 1 as an imaging device is transmitted to a reproduction device 2 through a network 3 and the encoded data is decoded to reproduce the image.

The camera system 1 includes a stacked image sensor 10 and a network interface 17.

FIG. 4 illustrates an example of a stacked structure of the stacked image sensor 10.

The stacked image sensor 10 has a multilayer substrate structure in which a sensor layer 10A and a logic circuit layer 10B are stacked. The sensor layer 10A and the logic circuit layer 10B are configured to be electrically coupled to each other by, for example, a via.

The sensor layer 10A includes a light receiving section 11 and an A/D conversion circuit 12.

The light receiving section 11 outputs a pixel signal corresponding to incident light having entered through an unillustrated shooting lens. The light receiving section 11 includes, for example, a photoelectric conversion element such as a photodiode, and includes a plurality of pixels. The light receiving section 11 includes, for example, a solid-state imaging element such as a CCD or a CMOS. The A/D conversion circuit 12 performs A/D conversion of the pixel signal from the light receiving section 11, and outputs RAW data of a moving image based on the pixel signal.

The logic circuit layer 10B includes an image processing circuit 13, a moving image encoder 14, an auxiliary sensor 16, and an output interface 15.

The auxiliary sensor 16 outputs sensor information to the moving image encoder 14. The auxiliary sensor 16 includes, for example, a gyro sensor or the like, and outputs, for example, attitude data as the sensor information to the moving image encoder 14. The sensor information is used as control data for performing image correction processing to be performed after decoding the RAW data in the reproduction device 2.

The image processing circuit 13 performs at least some pieces of preprocessing of a plurality of pieces of preprocessing to be performed before demosaic processing on the RAW data from the sensor layer 10A. The image processing circuit 13 outputs, to the moving image encoder 14, the RAW data having been subjected to the some pieces of preprocessing of the demosaic processing and control data for performing image correction processing to be performed after decoding the RAW data in the reproduction device 2. As illustrated in FIG. 5 to be descried later, the image processing circuit 13 includes a white balance detection circuit (AE/AWB detection circuit 34) that performs detection processing for adjusting white balance as the some pieces of preprocessing. As illustrated in FIG. 5 to be described later, the image processing circuit 13 outputs detection information as the control data. The detection information includes white balance detection information (AWB detection information) for adjusting white balance detected by the white balance detection circuit, and the like. In addition, as illustrated in FIG. 5 to be described later, the image processing circuit 13 outputs, as the control data, information including information regarding lens distortion of an image caused by the unillustrated shooting lens and image shading information.

The moving image encoder 14 encodes the RAW data having been subjected to the pieces of preprocessing by the image processing circuit 13 and the control data from the image processing circuit 13 and the auxiliary sensor 16, and outputs the RAW data and the control data to the network interface 17 through the output interface 15. For example, as illustrated in FIG. 7 to be described later, the moving image encoder 14 generates stream data that has a header region where the control data is superimposed and includes the RAW data, and outputs the stream data as encoded data.

The network interface 17 transmits the encoded data outputted from the moving image encoder 14 through the output interface 15 to the reproduction device 2 through the network 3.

The reproduction device 2 includes a network interface 21, a moving image decoder 22, and an image processing circuit 23.

The network interface 21 receives the encoded data transmitted from the camera system 1, and outputs the encoded data to the moving image decoder 22. The moving image decoder 22 decodes the RAW data and the control data that are encoded by the camera system 1, and outputs the RAW data and the control data to the image processing circuit 23.

FIG. 5 illustrates a configuration example of the image processing circuit 13 in the camera system 1 of the image processing system according to the first embodiment. FIG. 6 illustrates a configuration example of the image processing circuit 23 in the reproduction device 2 of the image processing system according to the first embodiment.

The image processing system according to the first embodiment has a configuration in which a plurality of circuits included in the image processing circuit 113 in the camera system 101 according to the comparative example illustrated in FIGS. 1 and 2 is divided into the image processing circuit 13 in the camera system 1 and the image processing circuit 23 in the reproduction device 2.

Here, the image processing circuit 13 in the camera system 1 corresponds to a specific example of a "preceding image processing circuit" in the technology of the present disclosure. The image processing circuit 23 in the reproduction device 2 corresponds to a specific example of a "subsequent image processing circuit" in the technology of the present disclosure.

The image processing circuit 13 as the preceding image processing circuit includes the black level correction circuit 31, the lattice defect correction circuit 32, the noise removal circuit 33, and the AE/AWB detection circuit 34. Accordingly, the image processing circuit 13 performs pieces of processing until detection processing by the AE/AWB detection circuit 34 of the plurality of pieces of preprocessing to be performed before the demosaic processing on the RAW data from the sensor layer 10A.

The image processing circuit 23 as the subsequent image processing circuit includes the white balance adjustment circuit 35, the demosaicing circuit 36, the linear matrix circuit 41, the gamma correction circuit 42, the Y/C conversion circuit 43, the sharpness processing circuit 51, the chroma processing circuit 52, and the correction circuit 53. Accordingly, the image processing circuit 23 performs white balance adjustment processing by the white balance adjustment circuit 35 of the plurality of pieces of preprocessing to be performed before the demosaic processing on the RAW data. In addition, the image processing circuit 23 performs the demosaic processing on the RAW data by the demosaicing circuit 36 to generate RGB data, and thereafter performs processing of converting the RGB data into Y/C data, and image correction processing on the Y/C data.

In the image processing circuit 23, the white balance adjustment circuit 35 performs, as a piece of preprocessing of the demosaic processing, white balance adjustment processing on the RAW data decoded by the moving image decoder 22 on the basis of white balance detection information (AWB detection information) included in the control data.

The demosaicing circuit 36 performs the demosaic processing on the RAW data decoded by the moving image decoder 22.

The correction circuit 53 performs image correction processing on image data (Y/C data) having been subjected to the demosaic processing on the basis of the sensor information, information regarding lens distortion, image shading information, and the like that are included in the control data.

1.2 Operation

In the camera system 1 as the imaging device according to the first embodiment, the sensor layer 10A and the logic circuit layer 10B are stacked in the stacked image sensor 10. The logic circuit layer 10B includes the image processing circuit 13 that performs some pieces of preprocessing before the demosaic processing on the RAW data, the moving image encoder 14 that encodes the RAW data having been subjected to the some pieces of preprocessing, and the auxiliary sensor 16. The moving image encoder 14 is mounted on the stacked image sensor 10; therefore, stream data as encoded data is outputted directly from the stacked image sensor 10.

In general, an image processing circuit in an imaging device performs processing of performing various pieces of image processing on RAW data outputted from an image sensor to convert the RAW data into Y/C data that is a standard input format of image encoding. In contrast, in the camera system 1 according to the first embodiment, the image processing circuit 13 as the preceding image processing circuit performs minimum pieces of processing until the AE/AWB detection circuit 34 that performs detection processing that needs feedback to the sensor layer 10A. This makes it possible to minimize the preceding image processing circuit and efficiently use a limited region of the logic circuit layer 10B. The image processing circuit 13 outputs, to the moving image encoder 14, control data (lens distortion and shading information) that is not temporally variable in a system, control data (detection information and sensor information) that is variable for each frame, and the like, in addition to the RAW data.

The moving image encoder 14 performs moving image compression on the RAW data from the image processing circuit 13 to generate a stream, and outputs the stream as encoded data. On this occasion, control data (such as lens distortion, shading information, detection information, and sensor information) necessary for pieces of image processing by the image processing circuit 23 of the reproduction device 2 is superimposed on a portion of user data of a header of the stream.

FIG. 7 illustrates an example of stream data.

FIG. 7 illustrates an MPEG (Moving Picture Experts Group) format stream as the example of the stream data. As illustrated in FIG. 7, the stream data includes, for example, an I-picture in which intra encoding is performed and a P-picture in which inter encoding is performed. A sequence header is disposed at the head of the stream data. A picture header is disposed at the head of each picture. The sequence header and the picture header include a user data region. In a standard encoding syntax such as MPEG, a header (sequence header) holding invariable information in a sequence and a header (picture header) holding information that is variable for each picture are generally disposed in the stream as illustrated in FIG. 7. Each of the headers includes a user data region (private header) that is defined and usable by a user for each application.

As illustrated in FIG. 7, the moving image encoder 14 generates stream data that has a header region where the control data is superimposed and includes the RAW data, and outputs the stream data as encoded data.

For example, it is desirable to dispose, in the user data region of the sequence header, temporally invariable data such as lens distortion and shading information of the control data. In addition, it is desirable to dispose, in the user data region of the picture header, information that is variable for each frame, such as detection information and sensor information (such as attitude data). In an actual operation, in order to enable reproduction in the middle of the stream, in many cases, the sequence header is disposed before each I-picture that serves as an entry point of reproduction. Such disposition makes it easy to associate a frame of the RAW data with the control data necessary to process the frame of the RAW data in the image processing circuit on side of the reproduction device 2 as the subsequent image processing circuit.

The stream data outputted from the camera system 1 is transmitted to the reproduction device 2 through the network 3, and thereafter decoded. The decoded stream data is subjected to pieces of image processing by the image processing circuit 12 on side of the reproduction device 2, and thereafter displayed on a display or the like. On this occasion, the moving image decoder 22 of the reproduction device 2 extracts the control data from the header of the stream, and supplies the control data together with the RAW data to the subsequent image processing circuit 23.

1.3 Effects

As described above, according to the imaging device and the image processing system according to the first embodiment, the logic circuit layer 10B stacked on the sensor layer 10A performs at least some pieces of preprocessing of the plurality of pieces of preprocessing to be performed before the demosaic processing on the RAW data from the sensor layer 10A, and encodes the RAW data having been subjected to the some pieces of preprocessing and outputs the RAW data, which makes it possible to achieve circuit miniaturization and low electric power consumption.

In addition, according to the imaging device according to the first embodiment, pieces of processing to be performed in the image processing circuit 13 (preceding image processing circuit) mounted on the logic circuit layer 10B of the stacked image sensor 10 are limited to some pieces of preprocessing, which makes it possible to reduce areas of circuits mounted on the logic circuit layer 10B. This makes it possible to achieve mounting in a limited area and reduce electric power consumption.

In addition, according to the image processing system according to the first embodiment, pieces of processing other than pieces of image processing to be performed in the preceding image processing circuit are performed in the image processing circuit 23 (subsequent image processing circuit) on side of the reproduction device 2, which makes it possible to offload most of large-scale image processing processes on side of the reproduction device 2 and makes it possible to reduce electric power consumption of a camera device.

In addition, according to the image processing system according to the first embodiment, the control data obtained in the logic circuit layer 10B of the stacked image sensor is superimposed on the header region of the stream data, which makes it easy to associate the control data with a frame to be subjected to a piece of image processing upon performing an image processing process in the image processing circuit 23 (subsequent image processing circuit) on side of the reproduction device 2.

In addition, the control data includes sensor information such as attitude data of the auxiliary sensor 16, which makes it possible to extract the attitude data or the like from the header region of the stream data and perform shake correction in the image processing circuit 23 on side of the reproduction device 2. Shifting a function having a heavy processing load such as shake correction from side of the camera device to side of the reproduction device makes it possible to reduce electric power consumption on side of the camera device. In addition, it is possible to select whether or not to perform shake correction in accordance with ability of the reproduction device.

It is to be noted that the effects described herein are merely illustrative and non-limiting, and other effects may be included. The same applies to effects of other embodiments below.

1.4 Modification Examples

In the first embodiment described above, an example of a network camera system in which RAW data encoded in the camera system 1 is transmitted to the reproduction device 2 through the network 3 and the RAW data is decoded to reproduce an image has been described as an example of the image processing system; however, the configuration of the image processing system is not limited thereto. For example, a configuration may be adopted in which the RAW data encoded in the camera system 1 is recorded in a recording medium and in the reproduction device 2, the RAW data recorded in the recording medium is decoded to reproduce an image.

In the first embodiment described above, a configuration is adopted in which pieces of processing until a piece of processing by the AE/AWB detection circuit 34 of the plurality of pieces of preprocessing to be performed before the demosaic processing on the RAW data are performed in the preceding image processing circuit (image processing circuit 13) and pieces of processing from a piece of processing by the white balance adjustment circuit 35 are performed in the subsequent image processing circuit (image processing circuit 23); however, configurations of the preceding image processing circuit and the subsequent image processing circuit are not limited thereto. For example, a configuration may be adopted in which pieces of processing before the piece of processing by the AE/AWB detection circuit 34 are performed in the preceding image processing circuit. Alternatively, a configuration may be adopted in which pieces of processing before a piece of processing by the demosaicing circuit 36 and after the piece of processing by the AE/AWB detection circuit 34 are performed in the preceding image processing circuit.

In addition, in the first embodiment described above, a case where generation and processing of a moving image are performed has been described as an example; however, the technology according to the present disclosure is also applicable to a case where generation and processing of not only a moving image but also a still image are performed.

2. Other Embodiments

The technology is not limited to description of the embodiments described above, and may be modified in a variety of ways.

It is to be noted that the present technology may have the following configurations.

According to the present technology having the following configurations, a logic circuit layer stacked on a sensor layer performs at least some pieces of preprocessing of a plurality of pieces of preprocessing to be performed before demosaic processing on RAW data from the sensor layer, and encodes and outputs the RAW data having been subjected to the pieces of preprocessing, which makes it possible to achieve circuit miniaturization and low electric power consumption.

(1)

An imaging device including:
- a sensor layer including a light receiving section that outputs a pixel signal corresponding to incident light, the sensor layer that outputs RAW data based on the pixel signal; and
- a logic circuit layer that is stacked on the sensor layer, and includes an image processing circuit and an encoder, the image processing circuit that performs at least some pieces of preprocessing of a plurality of pieces of preprocessing to be performed before demosaic processing on the RAW data from the sensor layer, and the encoder that encodes the RAW data having been subjected to the pieces of preprocessing by the image processing circuit.

(2)

The imaging device according to (1), in which the image processing circuit includes an exposure detection circuit that performs detection processing for performing exposure control of the light receiving section as the some pieces of preprocessing.

(3)

The imaging device according to (1) or (2), in which
  the image processing circuit outputs control data for performing image correction processing to be performed after decoding the RAW data encoded by the encoder, and the RAW data having been subjected to the pieces of preprocessing by the image processing circuit, and the encoder encodes and outputs the RAW data and the control data.

(4)

The imaging device according to (3), in which the encoder generates and outputs stream data that has a header region where the control data is superimposed and includes the RAW data.

(5)

The imaging device according to (3) or (4), in which the image processing circuit includes a white balance circuit that performs detection processing for adjusting white balance as the some pieces of preprocessing, and the control data includes white balance detection information for adjusting the white balance detected by the white balance detection circuit.

(6)

The imaging device according to any one of (3) to (5), in which the logic circuit layer further includes an auxiliary sensor, and the auxiliary sensor outputs sensor information as the control data to the encoder.

(7)

An image processing system including:

an imaging device that encodes and outputs RAW data based on a pixel signal; and a reproduction device that decodes and reproduces the RAW data encoded by the imaging device, the imaging device including a sensor layer including a light receiving section that outputs the pixel signal corresponding to incident light, the sensor layer that outputs the RAW data based on the pixel signal, and a logic circuit layer that is stacked on the sensor layer and includes a preceding image processing circuit and an encoder, the preceding image processing circuit that performs at least some pieces of preprocessing of a plurality of pieces of preprocessing to be performed before demosaic processing on the RAW data from the sensor layer, and the encoder that encodes the RAW data having been subjected to the pieces of preprocessing by the preceding image processing circuit.

(8)

The image processing system according to (7), in which the reproduction device includes a decoder that decodes the RAW data encoded by the imaging device, and a subsequent image processing circuit including a demosaicing circuit that performs demosaic processing on the RAW data decoded by the decoder.

(9)

The image processing system according to (8), in which in the imaging device, the preceding image processing circuit outputs control data for performing image correction processing to be performed after decoding the RAW data encoded by the encoder, and the RAW data having been subjected to the pieces of preprocessing by the preceding image processing circuit, and the encoder encodes and outputs the RAW data and the control data, and in the reproduction device, the decoder decodes the RAW data and the control data encoded by the imaging device.

(10)

The image processing system according to (9), in which in the imaging device, the preceding image processing circuit includes a white balance detection circuit that performs detection processing for adjusting white balance as the some pieces of preprocessing, and the control data includes white balance detection information for adjusting the white balance detected by the white balance detection circuit, and in the reproduction device, the subsequent image processing circuit further includes a white balance adjustment circuit that performs white balance adjustment processing on the RAW data decoded by the decoder as a piece of preprocessing of the demosaic processing on the basis of the white balance detection information.

(11)

The image processing system according to (9) or (10), in which in the imaging device, the logic circuit layer further includes an auxiliary sensor, the auxiliary sensor outputs sensor information as the control data to the encoder, and in the reproduction device, the subsequent image processing circuit further includes a correction circuit that performs image correction processing on image data having been subjected to demosaic processing by the demosaicing circuit on the basis of the sensor information by the auxiliary sensor.

This application claims the priority on the basis of Japanese Patent Application No. 2020-142096 filed on Aug. 25, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device, comprising:

a sensor layer that includes a light receiving section configured to output a pixel signal corresponding to incident light, wherein the sensor layer is configured to output RAW data based on the pixel signal; and a logic circuit layer stacked on the sensor layer, wherein the logic circuit layer includes an image processing circuit and an encoder, the image processing circuit is configured to:

perform at least a set of pieces of preprocessing of a plurality of pieces of preprocessing before demosaic processing on the RAW data; and output control data that includes lens distortion and shading information, detection information and sensor information, and the encoder is configured to:

encode the processed RAW data and the control data; and generate stream data as encoded data, wherein the stream data includes:

the processed RAW data, and the lens distortion and shading information of the control data in a sequence header of the stream data and the detection information and the sensor information of the control data in a picture header of the stream data.

2. The imaging device according to claim 1, wherein the image processing circuit includes an exposure detection circuit configured to perform, as the set of pieces of preprocessing, detection processing to perform exposure control of the light receiving section.

3. The imaging device according to claim 1, wherein the encoder is further configured to output the stream data that includes the RAW data and a header region where the control data is superimposed.

4. The imaging device according to claim 1, wherein the image processing circuit further includes a white balance circuit configured to perform, as the set of pieces of preprocessing, detection processing to adjust white balance, and the control data includes white balance detection information to adjust the detected white balance.

5. The imaging device according to claim 1, wherein the logic circuit layer further includes an auxiliary sensor, and the auxiliary sensor is configured to output the sensor information to the encoder.

6. An image processing system, comprising:
  an imaging device configured to encode and output RAW data based on a pixel signal; and
  a reproduction device configured to decode and reproduce the RAW data encoded by the imaging device, wherein the imaging device includes:
    a sensor layer that includes a light receiving section configured to output the pixel signal corresponding to incident light, wherein the sensor layer is configured to output the RAW data based on the pixel signal, and
    a logic circuit layer that is-stacked on the sensor layer, wherein the logic circuit layer includes a preceding image processing circuit and an encoder,
    the preceding image processing circuit is configured to:
      perform at least a set of pieces of preprocessing of a plurality of pieces of preprocessing to be performed before demosaic processing on the RAW data; and
      output control data that includes lens distortion and shading information, detection information and sensor information, and
    the encoder is configured to:
      encode the processed RAW data and the control data; and
      generate stream data as encoded data, wherein the stream data includes:
        the processed RAW data, and
        the lens distortion and shading information of the control data in a sequence header of the stream data and the detection information and the sensor information of the control data in a picture header of the stream data.

7. The image processing system according to claim 6, wherein the reproduction device includes:
  a decoder configured to decode the RAW data encoded by the imaging device, and
  a subsequent image processing circuit that includes a demosaicing circuit configured to perform the demosaic processing on the RAW data decoded by the decoder.

8. The image processing system according to claim 7, wherein
  the encoder is further configured to encode and output the RAW data and the control data, and
  the decoder is further configured to decode the RAW data and the control data encoded by the imaging device.

9. The image processing system according to claim 8, wherein
  the preceding image processing circuit is further configured to include a white balance detection circuit configured to perform detection processing to adjust white balance as the set of pieces of preprocessing, and the control data includes white balance detection information to adjust the detected white balance, and
  the subsequent image processing circuit further includes a white balance adjustment circuit configured to perform white balance adjustment processing on the decoded RAW data as a piece of preprocessing of the demosaic processing based on the white balance detection information.

10. The image processing system according to claim 8, wherein
  the logic circuit layer further includes an auxiliary sensor,
  the auxiliary sensor is configured to output the sensor information as the control data to the encoder, and
  the subsequent image processing circuit further includes a correction circuit configured to perform image correction processing on image data after the demosaic processing by the demosaicing circuit based on of the sensor information.

* * * * *